March 7, 1933. E. SCHMIERER 1,900,523
PACKING GLAND
Filed Feb. 14, 1930 2 Sheets-Sheet 1

Eugene Schmierer
INVENTOR

March 7, 1933.  E. SCHMIERER  1,900,523
PACKING GLAND
Filed Feb. 14, 1930   2 Sheets-Sheet 2

Eugene Schmierer
INVENTOR

Patented Mar. 7, 1933

1,900,523

UNITED STATES PATENT OFFICE

EUGENE SCHMIEBER, OF SAGINAW, MICHIGAN, ASSIGNOR TO BAKER PERKINS COMPANY, INC., OF SAGINAW, MICHIGAN, A CORPORATION OF NEW YORK

PACKING GLAND

Application filed February 14, 1930. Serial No. 428,322.

This invention relates to a packing gland such as is used to prevent material, such as gas, liquid etc., from leaking along a revolvable shaft where it passes through a wall and is more particularly adapted to be used on rubber mixers, washers, dispensers, and masticators.

In the treatment of rubber and rubber solutions in particular, a great deal of difficulty has been experienced in the past in preventing the rubber from leaking around the shaft where the shaft passes through the mixer wall.

Prior to my invention a resilient packing such as palmetto, asbestos, carbon, shredded metal, etc., was compressed around the shaft by the usual packing gland to overcome this leakage, but owing to the wobbling motion of the shaft, due to deflection, the wear of the packing was greatly increased over the natural wear which is caused by the frictional contact of the packing against the revolving shaft.

As a great deal of pressure is exerted on the rubber by the mixing and masticating action of the mixer blade it is necessary to exert a considerable amount of pressure on the packing to equalize the pressure in the mixer, hence the life of the packing is shortened by wear and small openings appear into which the rubber particles are forced.

Owing to the elasticity and toughness of the rubber it has the peculiar characteristics of working into these small clearances in the packing and as it enters under pressure it expands when the pressure is momentarily released, due to shaft wobble. As the rubber particles expand they further force the packing apart, thus the continued compressing and expanding of the rubber particles forces or pumps these particles further through the packing and being followed by others soon cuts a furrow to the outside of the mixer through which the rubber and liquids can then flow freely through the packing.

These resilient packings, when compressed against the revolving shaft, will last from twelve to forty eight hours in the ordinary usage of the mixer and the shredded metal packings will last only a short time longer, hence the operating costs of these machines are high owing to the necessity of constantly replacing packing, and also much material is lost due to leakage.

The prime object of my invention is to overcome the above difficulties by providing a seal at the point where the material tends to follow the shaft through the mixer wall and which seal is not affected by the shaft wobble, or deflection.

A further object is to eliminate flexible packing from the moving parts so that the machines, to which my invention is applied, require the minimum of attention, thereby effecting a saving of material and labor.

A still further object is to provide a packing gland that may be quickly and easily assembled for replacement of parts and which will automatically take up the seal joint as wear occurs.

I accomplish these objects by securing to the shaft, at a point adjacent the mixer wall, a hardened steel seal ring having a polished face. A spring pressed gland having one end polished bears against the seal ring and forms a tight joint which excludes the material in the mixer from the shaft where it passes through the mixer wall. The gland loosely surrounds the shaft and is loosely received in the bore of the mixer wall so that shaft wobble does not touch or move the sealing end of the gland out of contact with the seal ring.

The gland itself may move axially with the seal ring as it follows the wobbling movement of the shaft, but owing to the clearance between the shaft and gland and the bore of the mixer wall any eccentric rotating movement of the shaft will not move the bearing end of the gland out of contact with the sealing ring; likewise any end play or axial drift due to loose thrust bearing will not affect the seal joint, due to the flexible contact between the sealing members, therefore the material cannot reach the shaft and follow it to the outside of the mixer. Should small particles of the material being worked be forced between the sealing parts the centrifugal action of the revolving seal ring against the stationary seal part will force the particles back into the mixer bowl instead of allowing them to work toward the shaft.

To close the opening between the gland and bore in the end wall I surround the gland with a second compression gland having independent means adapted to compress a resilient packing against the seal gland and end wall of a counter bore. As there is no rotary movement between the gland and bore sufficient pressure may be exerted on the packing to overcome the pressure of the material in the mixer and consequently there is no leakage of material or loss of power due to friction on the shaft or loss of time in changing packing.

With these and certain other objects in view which will appear later in the specification, my invention comprises the devices described and claimed and the equivalents thereof.

In the accompanying drawings Fig. 1 is a vertical section of part of a rubber masticator showing my invention applied thereto.

Figure 1:
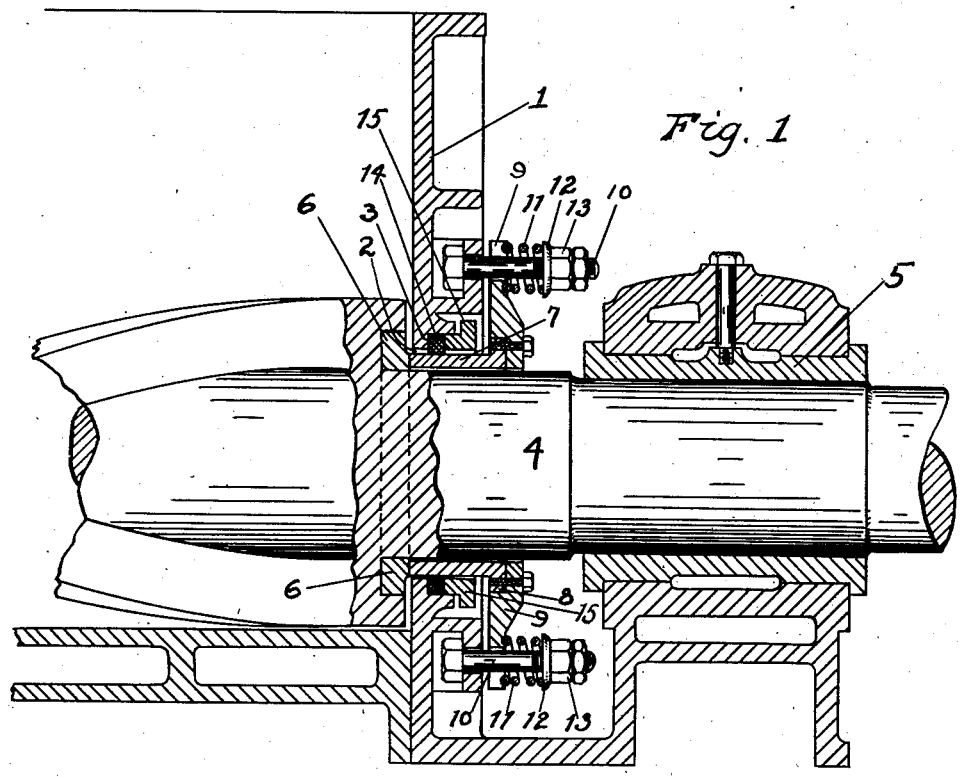
Figure 2:
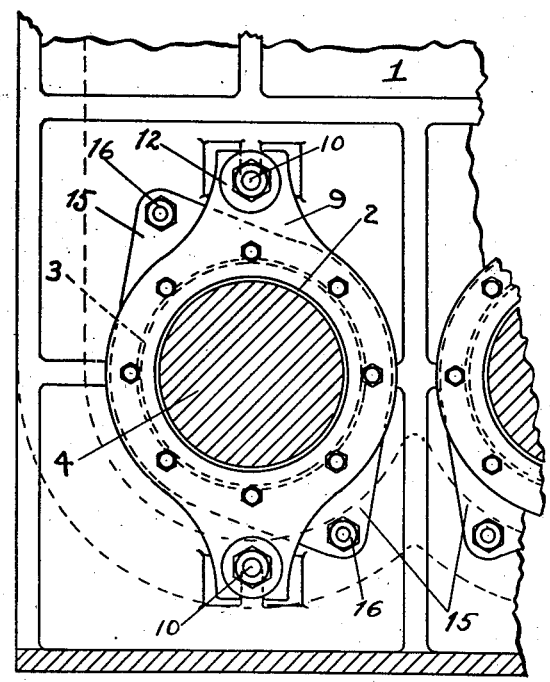
Fig. 2 is a front view of one section of a masticator with the shaft bearing removed to more clearly show the glands.

Referring now to the drawings 1 is the end wall of a mixer or other machine having a bore 2 and counter bore 3 through which a shaft 4 passes. The shaft 4 is generally supported at a distance from the mixer wall by a bearing 5.

Secured to the shaft 4 on the inside of the wall 1 is a seal ring 6 preferably made of hardened steel with a polished face. The polished face of the seal ring 6 is generally located in line with the inner face of the mixer wall; this being the point at which the material tends to enter the clearance around the shaft 4.

Figure 3:
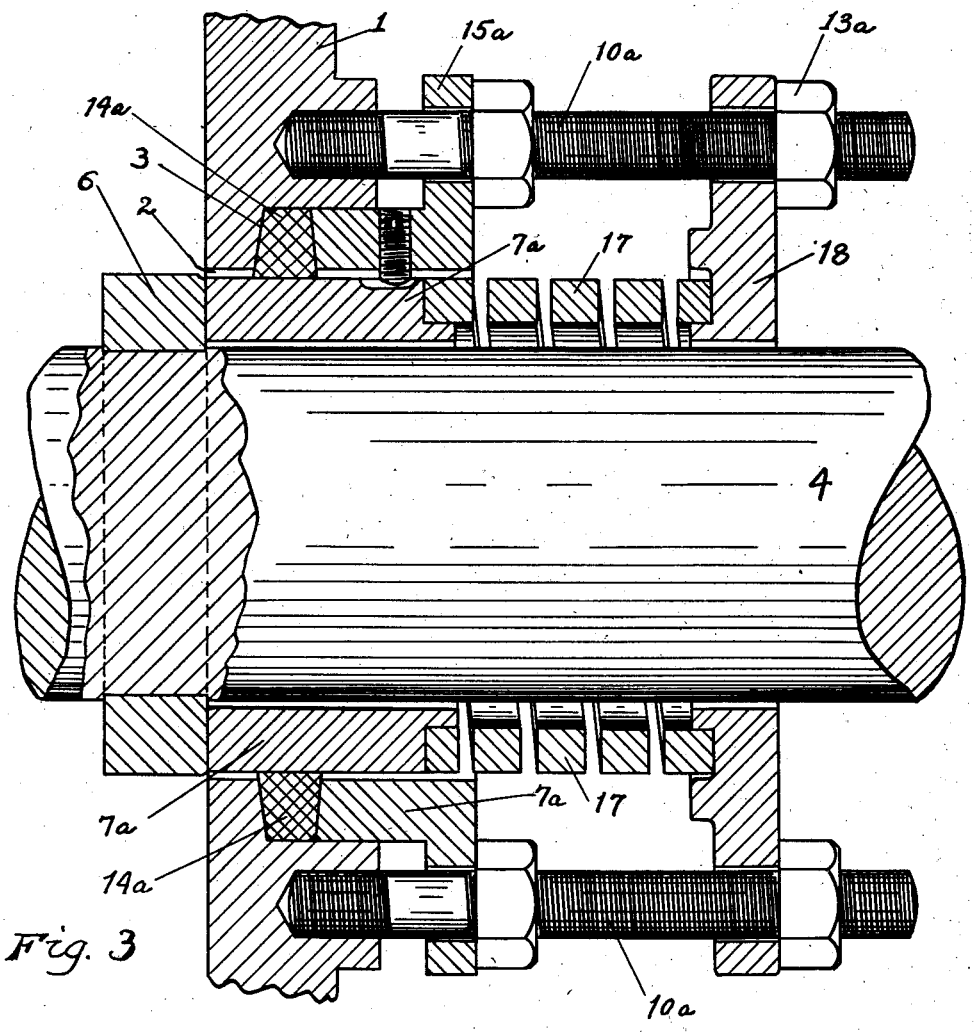
Fig. 3 is an enlarged longitudinal section of a modified form of my invention.

The seal ring 6 may be secured in a recess in the hub of the mixer blades as shown in Fig. 1 or it may be shrunk on the shaft or made in sections and secured thereto as shown in Fig. 3 or it may be formed as an integral part of the shaft without departing from the spirit of my invention.

Loosely surrounding the shaft 4 and loosely received in the bore 2 of the end wall is a gland composed of a sleeve portion 7 generally made of high grade cast iron having a polished end which bears against the seal ring 6 and seals the space between the shaft and sleeve portion 7 so that no material can be admitted to the shaft where it passes through the wall. The sleeve portion 7 terminates at its outer end in a flange 8 received in a recess of a gland plate 9. The gland plate is preferably made of steel to provide strength and prevent breakage due to uneven stresses on the tightening bolts 10. This construction also permits economical replacement in case of wear or breakage of the sleeve portion as that part only need be replaced instead of the entire gland.

The gland plate 9 with its sleeve portion 7 is held against the seal ring 6 by resilient springs 11 which surround the tightening bolts 10 and are interposed between the gland plate 9 and retainer 12. The tension necessary to hold the sleeve portion 7 in tight contact with the seal ring 6 is regulated by the tightening nuts 13, which compress the springs between the plate 9 and retainer 12.

By this construction any eccentric movement, that is, a movement at right angles to the axis of the shaft, will permit the seal ring 6 to slide across the face of the gland sleeve 7 without transmitting any lateral movement thereto.

Shaft deflection or axial drift which causes the seal ring to move in a direction parallel to the axis of the shaft, does not affect the seal because the seal ring 6 presses the gland against the tension of the springs 11 when moving in that direction and the spring tension causes the gland to follow the ring when it moves in the opposite direction.

The bore of the gland sleeve is sufficiently larger than the shaft diameter to permit the latter to wobble without touching the gland, therefore the gland cannot be moved out of contact with the seal ring by the eccentric motion of the shaft.

To seal the clearance between the outer surface of the sleeve portion 7 and bore 2 I surround the sleeve portion with a resilient packing 14 and compress it between the end of counter bore 3 and the sleeve portion by a second compression gland 15. The compression gland 15 compresses the packing 14 by the usual tightening bolts 16 threaded in the mixer wall 1 which permits adjustment of the pressure on the packing independent of the pressure against the seal ring 6 by the sleeve portion 7 or ring 19. This resilient packing 14 permits movement of the sleeve portion 7 by reason of its small bearing area and by its resilience and yet may be tightened sufficiently to overcome the pressure against it by the material being mixed. The only movement between the sleeve portion 7 and the resilient packing 14 is a slight rocking movement which is pivoted about the resilient packing and therefore the wear is very slight. Thus, the packing is assured a long life and operating costs are reduced to a minimum.

Referring now to Fig. 3 which is a modified form of my invention, the sleeve portion 7a is held against the seal ring 6 by a spring 17 which surrounds the shaft 4 and is adapted to be compressed by a compression plate 18. Tightening nuts 13a on studs 10a regulate the pressure of the compression plate 18 and spring 17. Thus the sleeve portion 7a is held against the seal ring 6 with sufficient pressure to prevent material from leaking around the shaft. The stud 10a may also be used to regulate the pressure of compression gland 15a against the resilient packing 14a.

Figure 4:
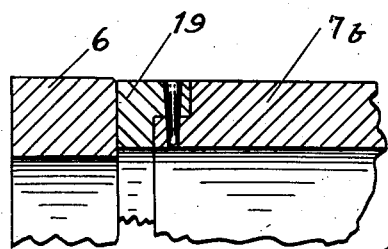
Fig. 4 is a portion of a detail of the seal ring and gland sleeve showing a modified form of sleeve.

In Fig. 4 I show a modified construction of the sleeve portion 7 for use where gritty or abrasive material is mixed with the rubber and wherein a separate ring 19 is employed to bear against the seal ring 6. This ring 19 may also be of hardened steel to resist wear and increase the life of the machine to which it is applied. The ring 19 is secured against rotation by being pinned or keyed to the sleeve portion 7b. This construction also is very economical from a maintenance viewpoint as only the ring 19 need be replaced in case of wear.

While I have shown and described the gland as being of the one piece variety yet it is understood that split glands may also be used without departing from the spirit of my invention. By the above means I have produced a packing gland which is simple and economical of construction, which does not require attention, is not affected by eccentric, irregular movement of the shaft, saves power, is practically frictionless and therefore does not heat up or wear.

Having thus described my invention, what I claim and desire to secure by Letters Patent is:

1. A packing gland for rubber and other tenacious material working machines comprising a hardened steel seal ring having a polished face secured to a shaft at the point where said shaft passes through a wall and revolvable therewith, a gland loosely surrounding said shaft and consisting of a sleeve portion having a polished end adapted to bear against said seal ring and a plate secured to the opposite end of said sleeve portion, tightening bolts passing through enlarged openings in said plate to secure the same against rotation, springs surrounding said tightening bolts whereby the sleeve portion is permitted to follow the eccentric motion of the seal ring, due to shaft deflection and irregular rotation and thereby hold the polished end of said sleeve portion in sealing contact with said seal ring, a resilient packing surrounding said sleeve portion adjacent said wall, a compression gland loosely surrounding said sleeve portion and having independent means adapted to compress said resilient packing against said sleeve portion and a portion of the wall through which said sleeve and shaft pass, whereby the compression of the resilient packing may be adjusted independently of the pressure applied to the metal seal joint for the purposes set forth.

2. A packing gland for rubber and other tenacious material working machines comprising a seal member secured to a shaft at the point where said shaft passes through a wall and revolvable therewith, a gland loosely surrounding said shaft and consisting of a sleeve portion and a flange portion, said sleeve portion adapted to contact in sealing relation with said seal member, tightening bolts passing through enlarged openings in said flange portion to secure the said gland against rotation, springs surrounding said tightening bolts, whereby the sleeve portion is permitted to follow the eccentric motion of the seal ring, due to shaft deflection and irregular rotation and thereby hold the sleeve portion and seal member in tight contact with each other, a resilient packing surrounding said sleeve portion adjacent said wall, a compression gland loosely surrounding said sleeve portion and having independent means adapted to compress said resilient packing against said sleeve portion and the portion of the wall through which said shaft passes, whereby the compression of the resilient packing may be adjusted independently of the pressure applied to the seal joint for the purposes set forth.

In testimony whereof I affix my signature.

EUGENE SCHMIERER.